(12) United States Patent
Gedenk

(10) Patent No.: US 6,595,504 B2
(45) Date of Patent: Jul. 22, 2003

(54) HYDRAULIC SPRING HAVING A DAMPER

(75) Inventor: Volker Gedenk, Hemmingen (DE)

(73) Assignee: Contitech Luftfedersysteme GmbH, Hannover (DE)

( * ) Notice: Subject to any disclaimer, the term of this patent is extended or adjusted under 35 U.S.C. 154(b) by 0 days.

(21) Appl. No.: 10/024,705

(22) Filed: Dec. 21, 2001

(65) Prior Publication Data

US 2002/0089103 A1 Jul. 11, 2002

(30) Foreign Application Priority Data

Dec. 22, 2000 (DE) .......................... 100 64 762

(51) Int. Cl.[7] ................................. F16F 13/10

(52) U.S. Cl. ..................................... 267/294; 267/141.1

(58) Field of Search ................ 267/140.11, 140.13, 267/141.1, 219, 294; 248/562, 566, 636

(56) References Cited

U.S. PATENT DOCUMENTS

| | | | | |
|---|---|---|---|---|
| 4,893,797 A | * | 1/1990 | Le Fol et al. ............ | 267/140.13 |
| 5,947,457 A | * | 9/1999 | Swanson et al. ....... | 267/140.14 |
| 6,244,578 B1 | * | 6/2001 | Schwerdt ............... | 267/140.13 |

FOREIGN PATENT DOCUMENTS

DE 44 46 800 9/1995

* cited by examiner

Primary Examiner—Christopher P. Schwartz
(74) Attorney, Agent, or Firm—Walter Ottesen1

(57) ABSTRACT

A hydraulic spring includes hydraulic volumes (4a, 4b). The hydraulic volumes (4a, 4b) are, on the one hand, closed off by a spring element (6) which is vulcanized into an outer ring (8). On the other hand, the volumes (4a, 4b) are delimited by a compensating membrane (10). The volume (4a, 4b) is subdivided by a partition wall (26) into two chambers (4a, 4b), namely, a work chamber (4a), which is next to the spring element (6), and a compensating chamber (4b), which is next to the compensating membrane (10). The partition wall (26) has at least one connecting channel (28) and the chambers (4a, 4b) alternately change in volume and are filled completely with a hydraulic liquid. The partition wall (26) is configured to be flat in order to achieve a damping element requiring only a low structural elevation. The partition wall plane is orientated transversely to the spring axis. At least one level connecting channel (28) extends within the flat partition wall (26). One end of the connecting channel opens into the work chamber (4a) and the other end of the connecting channel opens into the compensating chamber (4b). The at least one connecting channel (28) is preferably configured to have a spiral shape. Several connecting channels (28) can be arranged offset relative to each other in the partition wall (26) and these channels are configured to have a spiral shape.

7 Claims, 2 Drawing Sheets

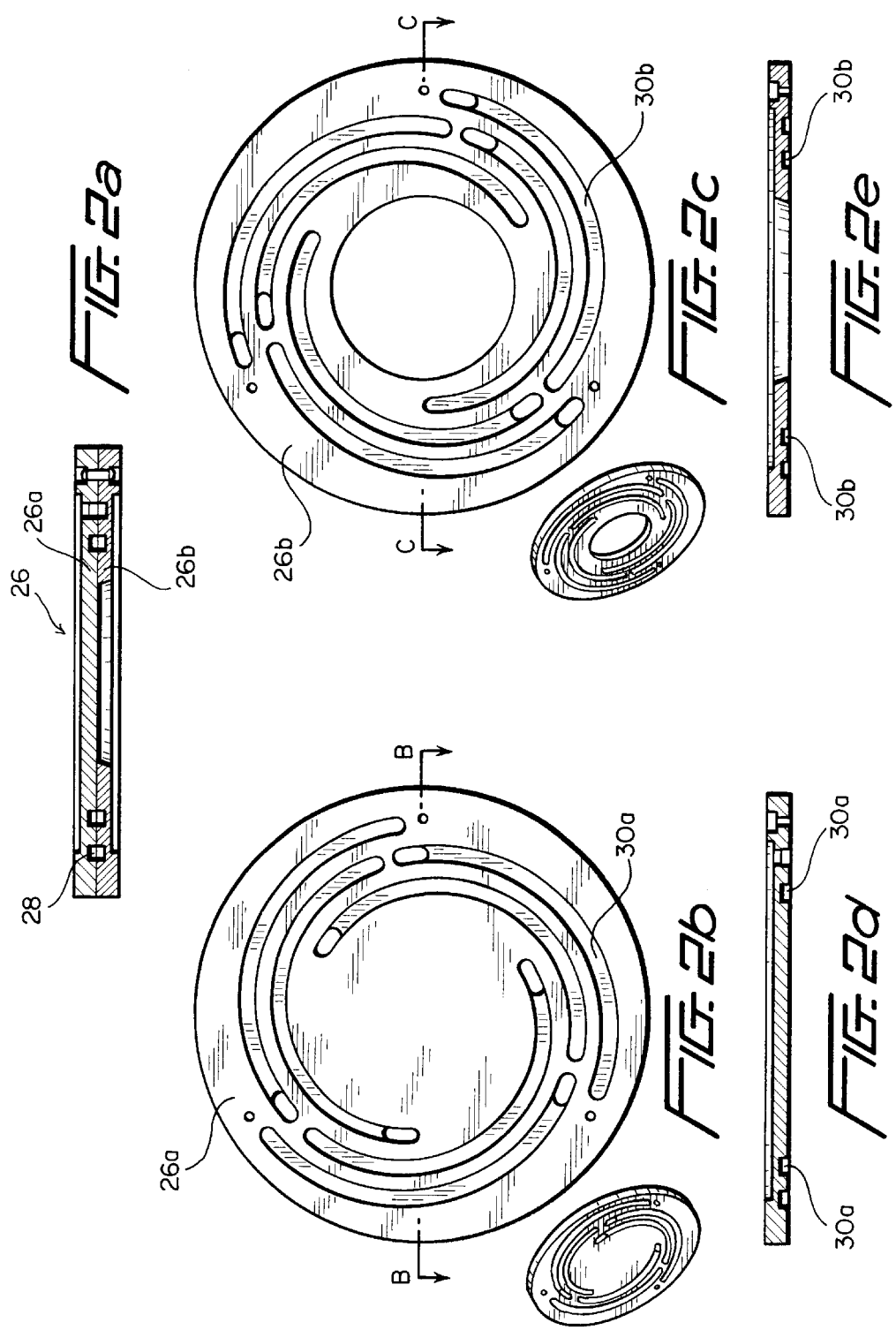

HYDRAULIC SPRING HAVING A DAMPER

FIELD OF THE INVENTION

The invention relates to a hydraulic spring having a damper, especially as a primary spring for use in rail vehicles as disclosed in German patent 4,446,800 wherein the spring is referred to as a "hydraulically damping elastic bearing".

BACKGROUND OF THE INVENTION

The bearing, which is described in German patent 4,446,800 with respect to FIG. 1a thereof, includes a spring element 1 which, on the one hand, is connected to a connecting part 11 and, on the other hand, is fixedly connected to a cylindrical housing 3. The spring element 1 is especially vulcanized to the cylindrical housing 3. The cylindrical housing 3 is secured with threaded fasteners to the other connecting part 12. The cup-shaped bearing cover 13 is connected as one piece to the connecting part 12 and has air compensating bores 13.1. The hydraulic damping system of the bearing comprises the work chamber 6 and the compensating chamber 7 closed off to the ambient by the highly flexible elastic compensating membrane 2 as well as a connecting channel 4 formed in the partition wall 5. The enclosed hydraulic liquid can flow throttled back and forth through the connecting channel 4 between the two chambers.

According to the state of the art, the partition wall 5, which is arranged within the elastic bearing, includes a cylindrical edge surface in which a screw-shaped slot is formed. Together with the housing 3, the slot, which is formed in the cylindrical edge surface, forms a channel 4 which connects the two hydraulic chambers 6 and 7 with each other.

The manufacture of the slot in the cylindrical edge surface is relatively cost intensive. The cylindrical edge requires a certain space in elevation for accommodating the same because of its axial height and this height cannot be used as a path for spring deflection. An adjustment of the damping to the particular masses to be suspended is not possible with the known connecting channel (damping channel 4).

SUMMARY OF THE INVENTION

It is an object of the invention to further develop the known hydraulic spring and it is especially an object of the invention to provide a damping element which is cost effective and requires a low structural elevation for accommodating the same.

The hydraulic spring of the invention includes: a rubber elastic spring element defining a spring axis; a highly flexible elastic compensating membrane; the rubber elastic spring element and the compensating membrane conjointly closing off a volume; a partition wall partitioning the volume into a work chamber delimited by the spring element and a compensating chamber delimited by the elastic compensating membrane; the chambers being changeable in volume and filled with hydraulic fluid; the partition wall having at least one connecting channel to permit a flow of the hydraulic fluid between the chambers during the operation of the hydraulic spring; an outer ring vulcanized to the spring element; the partition wall having a planar configuration and extending transversely to the spring axis; and, the connecting channel extending planar-like within the partition wall and having a first end opening into the work chamber and a second end opening into the compensating chamber.

According to a feature of the invention, a damping channel is disposed in a single plane arranged transversely to the spring axis. From this, a very low structural elevation results, that is, either the structural elevation, which is needed for damping channels, can be used for an expanded spring path or, for the same spring path, the spring can be constructed overall to be smaller.

An adequate flow length can be realized by a spirally-shaped configuration of the damping channel, which conducts hydraulic liquid and is configured to be planar, so that no compromises with respect to the damping action must be made.

Not only with respect to the channel is there sufficient play; rather, several connecting channels can be provided which are arranged offset to each other in the plane so that the individual flow paths are connected parallel to each other. By allocating the throttle to several individual channels, the channels can be configured to have different lengths and different cross sections. In this way, a significantly more broad banded damping can take place without the maximum damping becoming less.

Furthermore, several connecting channels can be arranged in several planes. In this way, any desired size damping action can be realized.

The connecting channels are preferably built up with the aid of two discs provided with respective slots orientated toward each other (throttle upper part and throttle lower part). The two discs conjointly define a partition wall.

The two discs define the hydraulic channel and can be rotated in mutually opposite directions. In this way, the effective cross section can be varied and one can adjust the damping characteristic.

Finally, the damping characteristic can be further influenced by a selection of the coarse and fine structures of the channel surface.

BRIEF DESCRIPTION OF THE DRAWINGS

The invention will now be described with reference to the drawings wherein:

FIG. 2a is a side elevation view, in section, of the partition wall mounted within the hydraulic spring;

FIG. 2b is a plan view of the upper part of the partition wall (throttle upper part) as seen from below;

FIG. 2c is a plan view from above of the lower part of the throttle wall (throttle lower part);

FIG. 2d shows the upper part of the partition wall in longitudinal section; and, FIG. 2e shows the lower part of the partition wall also in longitudinal section.

DESCRIPTION OF THE PREFERRED EMBODIMENTS OF THE INVENTION

Figure 1:
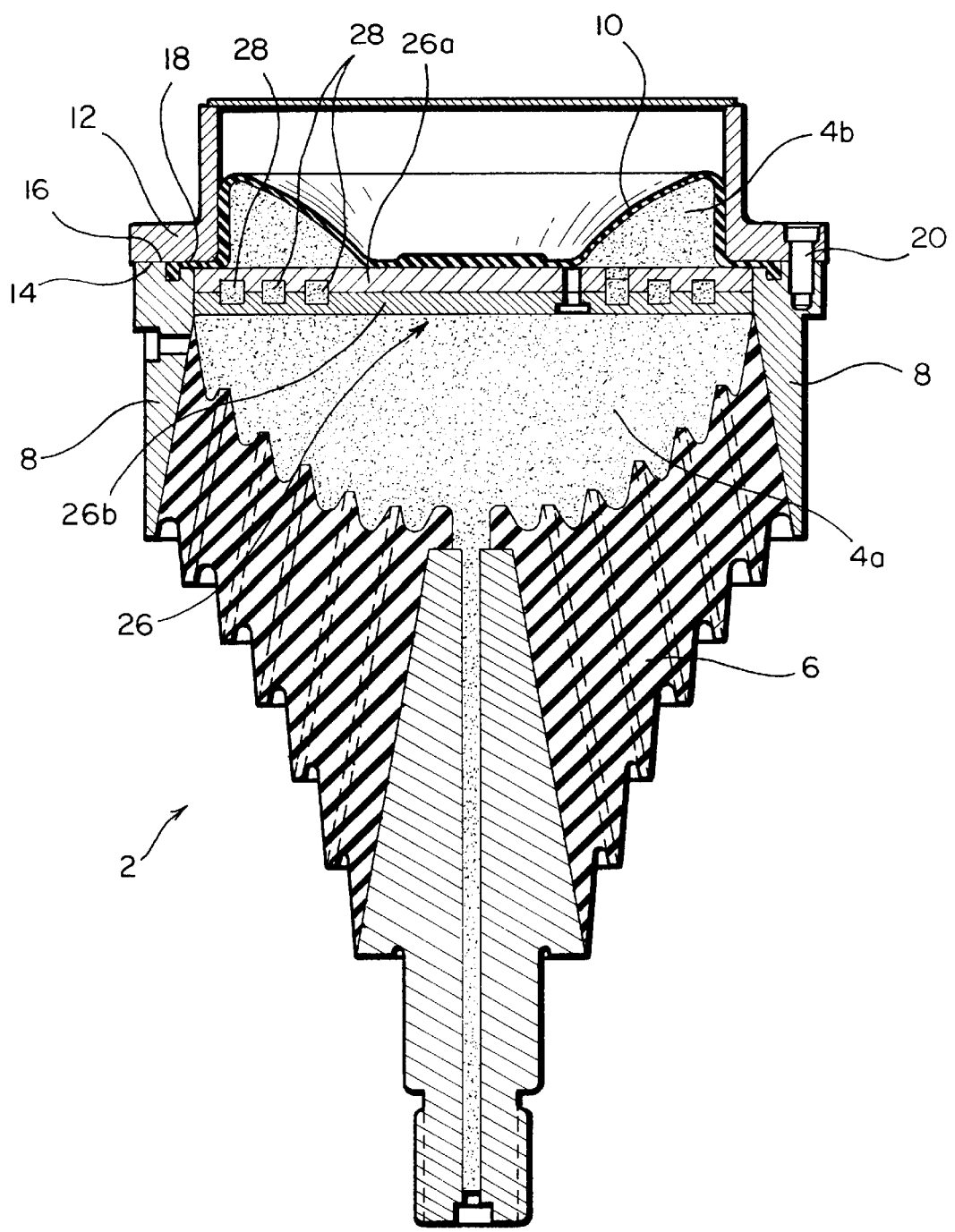
FIG. 1 is a side elevation view, in longitudinal section, of a hydraulic spring according to the invention.

The hydraulic volumes (4a, 4b) of the hydraulic spring 2 shown in FIG. 1 is closed off below by a spring element 6 which is vulcanized into an outer ring 8. Above, the volumes (4a, 4b) are delimited by a membrane 10.

The membrane 10 is pressure tightly attached to the outer ring 8 by means of a cover 12. For this purpose, the outer ring 8 has a planar sealing surface 14 and the cover 12 has a planar sealing surface 16. The outer edge portion 18 of the membrane 10 extends between the planar sealing surfaces (14, 16). Threaded fasteners 20 connect the cover 12 and the outer ring 8 with each other and ensure a pressure-tight attachment of the cover 12 on the outer ring B.

For the purpose of damping the spring action, the hydraulic volume (4a, 4b) is subdivided by a partition wall 26 into two component volumes (work chamber 4a, compensating chamber 4b). The partition wall 26 is provided with at least one connecting channel 28.

The partition wall (throttle) 26 comprises the throttle upper part 26a and the throttle lower part 26b. Both parts (26a, 26b) are provided with spirally-shaped slots (30a, 30b) as shown in FIG. 2a. The spirally-shaped slots correspond to each other and conjointly define the connecting channel (compensating channel) 28. The one end of the compensating channel 28 opens into the one chamber (4a or 4b) and the other end of the compensating channel 28 opens in the other chamber (4b or 4a).

During spring deflection, the chambers (4a, 4b) alternately change volume because the hydraulic liquid flows through the connecting channel 28. Because of the viscosity of the hydraulic liquid, a more or less intense damping takes place with the flow of the liquid through the connecting channel.

In the embodiment shown, the upper part 26a and the lower part 26b of the partition disc 26 can be rotated relative to each other whereby the effective channel cross section can be varied.

Except for the viscosity, the damping action is dependent upon the length, the effective cross section and the surface structure of the channel 28.

It is understood that the foregoing description is that of the preferred embodiments of the invention and that various changes and modifications may be made thereto without departing from the spirit and scope of the invention as defined in the appended claims.

What is claimed is:

1. A hydraulic spring comprising:

a rubber elastic spring element defining a spring axis;

a highly flexible elastic compensating membrane;

said rubber elastic spring element and said compensating membrane conjointly closing off a volume;

a partition wall partitioning said volume into a work chamber delimited by said spring element and a compensating chamber delimited by said elastic compensating membrane;

said chambers being changeable in volume and filled with hydraulic fluid;

said partition wall having at least one connecting channel to permit a flow of said hydraulic fluid between said chambers during the operation of said hydraulic spring;

an outer ring vulcanized to said spring element;

said partition wall having a planar configuration and extending transversely to said spring axis; and, said connecting channel extending within said partition wall and having a first end opening into said work chamber and a second end opening into said compensating chamber; and, said partition wall including first and second discs lying one atop the other; said first and second discs having first and second slots formed therein to correspond to each other; said first and second slots conjointly defining said connecting channel when said first and second discs are mounted one atop the other; and, said first and second discs being rotatable relative to each other so as to change the effective cross section of said connecting channel to thereby adjust the damping action of the hydraulic spring.

2. The hydraulic spring of claim 1, wherein said connecting channel is configured to have a spiral shape within said partition wall.

3. The hydraulic spring of claim 1, comprising a plurality of said connecting channels arranged within said partition wall offset one with respect to the other; and, said connecting channels defining respective flow paths connected in parallel with each other.

4. The hydraulic spring of claim 3, wherein said plurality of channels is disposed in a single plane within said partition wall.

5. The hydraulic spring of claim 3, wherein said plurality of channels is disposed in several planes within said partition wall.

6. The hydraulic spring of claim 1, wherein said partition wall comprises at least two discs lying one atop the other; at least one of said two discs having a spirally-shaped slot formed therein; and, said spirally-shaped slot defines said connecting channel when said two discs are in the assembled state one atop the other.

7. The hydraulic spring of claim 1, wherein said connecting channel has an inner surface formed so as to have a coarse or a fine structure to affect the flow characteristic of the hydraulic fluid flowing therethrough between said chambers.

\* \* \* \* \*